C. NEALE & G. BOOTH.
Culinary Vessels.

No. 154,272. Patented Aug. 18, 1874.

UNITED STATES PATENT OFFICE.

CHARLES NEALE, OF MARIETTA, AND GEORGE BOOTH, OF PHILADELPHIA, PENNSYLVANIA.

IMPROVEMENT IN CULINARY VESSELS.

Specification forming part of Letters Patent No. 154,272, dated August 18, 1874; application filed May 2, 1874.

*To all whom it may concern:*

Be it known that we, CHARLES NEALE, of Marietta, Lancaster county, State of Pennsylvania, and GEORGE BOOTH, of Philadelphia, in the county of Philadelphia and State of Pennsylvania, have invented certain new and useful Improvements in Culinary Boilers; and we do hereby declare the following to be a full, clear, and exact description of the invention, such as will enable others skilled in the art to which it pertains to make and use it, reference being had to the accompanying drawings, which form part of this specification, in which—

Figure 1:
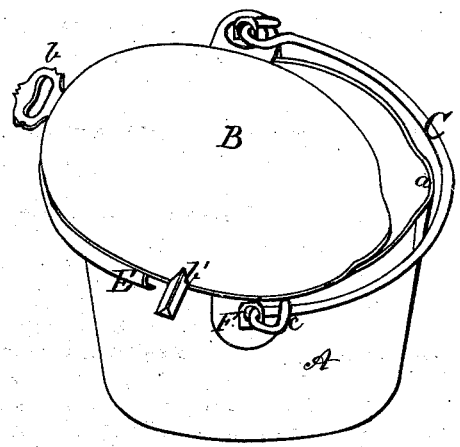
Figure 2:
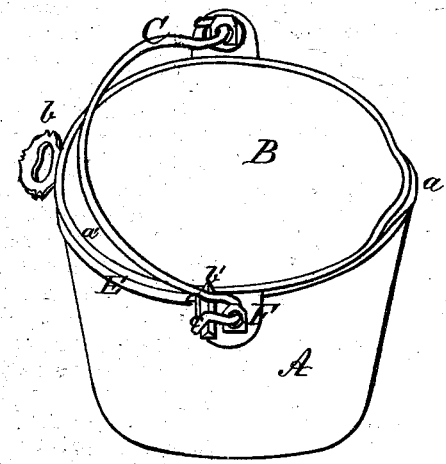

Figures 1 and 2 are perspectives of our invention.

Our invention has for its object to provide a culinary utensil, principally designed for boiling vegetables, &c., which can be tilted or turned over to enable the water or liquor to be drained off, while the lid remains fast in place, preventing the discharge of the vegetables and the escape of steam.

The nature of our invention consists in the novel construction and combination of parts, as hereinafter fully described.

Our boiler consists of a pot of the usual or any suitable form for the purpose indicated, having a swinging lid and a bail, which, when turned in one direction, locks the lid.

Referring to the accompanying drawing, A represents a pot or boiler; B, the swinging lid thereof; and C, the bail. $b$ represents a handle, and $b'$ a lug upon the lid B and $c$ is a hook formed by a continuation of one end of the bail C. When the bail C is turned back, as shown in Fig. 2, the hook $c$ engages with the lug $b'$. The handle $b$ and bail C being now grasped with one hand, the lid B is thereby held firmly in position, allowing the pot to be tilted and the water drawn off through the spout or lip $a$ without allowing the vegetables to come out.

In order to prevent the escape of steam from the vessel to the injury of the operator's hand, I provide the lid with a flange or lip, E, which engages with and embraces a corresponding ridge or bead, $a'$, on the upper edge of the vessel A. This not only prevents the escape of steam, as suggested, but serves also to aid the fixedness of the lid on the pot, relieving the handle and bail of a large portion of the strain.

What we claim as our invention is—

1. In combination with the vessel A, the swinging lid B, having the lug $b'$, and the bail C, having the hooked end $c$ engaging with lug $b'$, substantially as shown.

2. The combination of the vessel A, swinging lid B, having the handle $b$, beveled lug $b'$, and flange E, with the bail C, having hooked end $c$, substantially as described and shown.

3. In combination with a vessel, A, having a bead, $a'$, around its edge, a single swinging lid, B, having a concave flange, E, extending partly around its edge and encircling the bead, substantially as shown and described.

4. The combination, with the vessel A, having the bail C and bead $a'$, of the swinging lid B, having the handle $b$ for holding said lid when the vessel is tilted, and the flange E coinciding with said bead, substantially as and for the purpose set forth.

In testimony that we claim the foregoing we have hereunto set our hands, respectively, on the 27th day of April, and the 1st day of May, 1874.

CHARLES NEALE.
    GEORGE BOOTH.

Witnesses to signature of NEALE:
 ABRAHAM SUMMY,
 FREDERICK L. BAKER.

Witnesses to signature of BOOTH:
 JNO. A. BELL,
 M. DANL. CONNOLLY.